United States Patent [19]

Kuroki et al.

[11] Patent Number: 4,518,169
[45] Date of Patent: May 21, 1985

[54] AUTOMATIC VEHICLE HEIGHT-ADJUSTING SYSTEM

[75] Inventors: Junsuke Kuroki; Namio Irie; Haruto Tanaka, all of Yokohama, Japan

[73] Assignee: Nissan Motor Company, Limited, Yokohama, Japan

[21] Appl. No.: 476,519

[22] Filed: Mar. 18, 1983

[30] Foreign Application Priority Data

Apr. 6, 1982 [JP] Japan ............................ 57-56097

[51] Int. Cl.³ ................................ B60G 17/00
[52] U.S. Cl. ........................ 280/6 R; 180/41
[58] Field of Search ............. 280/6 R, 6 H, 703, 704, 280/DIG. 1, 707; 180/41

[56] References Cited

U.S. PATENT DOCUMENTS

| | | | |
|---|---|---|---|
| 3,830,138 | 8/1974 | Joneleit | 91/35 |
| 4,105,216 | 8/1978 | Graham et al. | 280/6 R |
| 4,390,187 | 6/1983 | Maeda | 280/6 R |

FOREIGN PATENT DOCUMENTS

| | | |
|---|---|---|
| 2647993 | 6/1977 | Fed. Rep. of Germany . |
| 3002765 | 7/1981 | Fed. Rep. of Germany . |
| 1210712 | 10/1970 | United Kingdom . |
| 2070289 | 9/1981 | United Kingdom . |

OTHER PUBLICATIONS

Vol. 5, No. 155 (M-90) (827), Japanese Abstract dated Sep. 30, 1981.

Primary Examiner—Joseph F. Peters, Jr.
Assistant Examiner—Kenneth R. Rice
Attorney, Agent, or Firm—Lane, Aitken and Kananen

[57] ABSTRACT

An automatic vehicle height-adjusting system is applied to a vehicle including a sprung mass and an unsprung mass in contact with a road surface, the sprung mass being supported on the unsprung mass via a spring or the like. The system includes a sensor, which senses the distance between the sprung mass and the road surface and generates a distance signal indicative thereof. In response to the distance signal, a first discriminator or comparator determines whether or not the distance is less than a first predetermined value, and generates a first comparison signal indicative thereof. In response to the distance signal, a second discriminator or comparator determines whether or not the distance is greater than a second predetermined value, and generates a second comparison signal indicative thereof. The second predetermined value is chosen to be greater than the first predetermined value. In response to the first and second comparison signals, a control mechanism increases the height of the sprung mass with respect to the unsprung mass when the distance is less than the first predetermined value, and decreases the height of the sprung mass with respect to the unsprung mass when the distance is greater than the second predetermined value.

5 Claims, 11 Drawing Figures

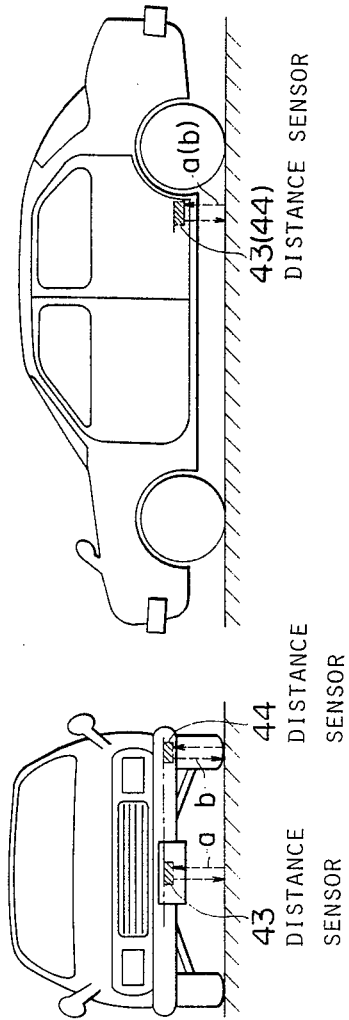

43 DISTANCE SENSOR
44 DISTANCE SENSOR

43(44) DISTANCE SENSOR

44 DISTANCE SENSOR
43 DISTANCE SENSOR

AUTOMATIC VEHICLE HEIGHT-ADJUSTING SYSTEM

BACKGROUND OF THE INVENTION

1. Field of the Invention

This invention relates to a system for automatically adjusting the height of a vehicle, such as a motorcar.

2. Description of the Prior Art

As is well-known in the automotive art, the sprung mass of a modern motor vehicle comprises the frame and body and associated components which are spring-mounted on the unsprung mass of the motor vehicle, usually including the wheels, drive train and front and rear axles. To maintain the vertical position or height of the sprung mass of the motor vehicle within a predetermined trim band as the vehicle load increases or decreases, automatic vehicle leveling systems are frequently employed.

Conventional vehicle leveling systems are designed to maintain a predetermined height relationship between the sprung and unsprung masses even as the vehicle load changes. Since the vehicle leveling systems thus operate independently of the distance between the bottom of the vehicle body and the road surface on which the vehicle is travelling, there is a chance that the bottom of the vehicle body may strike the road surface if the vehicle should bounce excessively while moving along a rutted road.

SUMMARY OF THE INVENTION

It is an object of this invention to provide an automatic vehicle height-adjusting system which responds to the distance between the bottom of the vehicle and the road surface on which the vehicle is travelling in order to prevent the vehicle from striking the road surface due to vehicle bouncing even when the vehicle is travelling along a rutted road.

In accordance with this invention, an automatic vehicle height-adjusting system is applied to a vehicle including a sprung mass and an unsprung mass in contact with a road surface, the sprung mass being supported on the unsprung mass via a spring or the like. The system includes a sensor, which senses the distance between the sprung mass and the road surface and generates a distance signal indicative thereof. In response to the distance signal, a first discriminator or comparator determines whether or not the distance is less than a first predetermined value, and generates a first comparison signal indicative thereof. In response to the distance signal, a second discriminator or comparator determines whether or not the distance is greater than a second predetermined value, and generates a second comparison signal indicative thereof. The second predetermined value is chosen to be greater than the first predetermined value. In response to the first and second comparison signals, a control mechanism increases the height of the sprung mass with respect to the unsprung mass when the distance is less than the first predetermined value, and decreases the height of the sprung mass with respect to the unsprung mass when the distance is greater than the second predetermined value.

The above and other objects, features and advantages of this invention will be apparent from the following description of a preferred embodiment thereof, taken in conjunction with the drawings.

BRIEF DESCRIPTION OF THE DRAWINGS

FIG. 2A is a front view of a motor vehicle equipped with the automatic vehicle height-adjusting system of FIG. 1 and standing on a level road;

FIG. 2B is a side view of the motor vehicle of FIG. 2A;

DESCRIPTION OF THE PREFERRED EMBODIMENT

Figure 1:
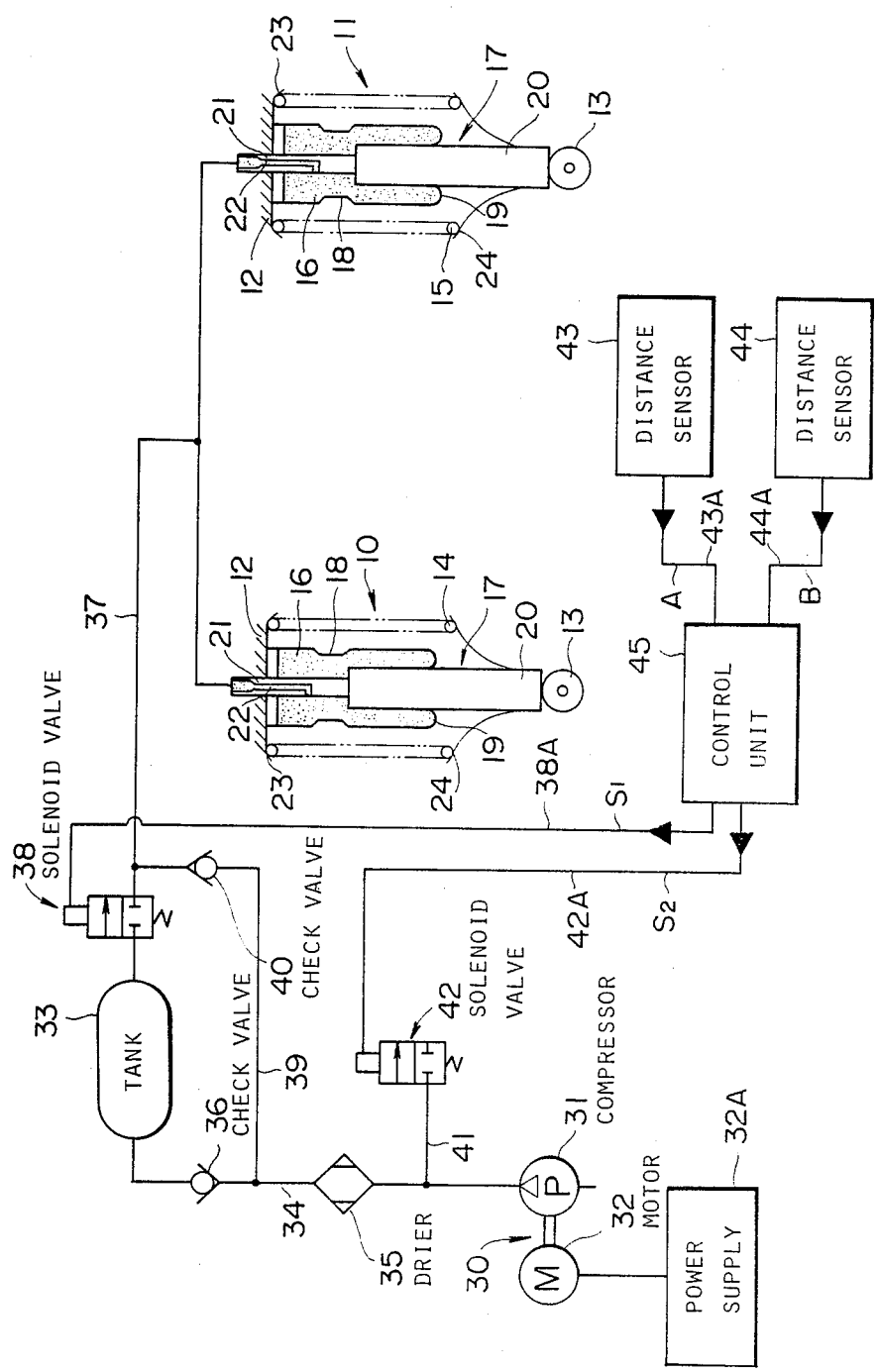
FIG. 1 is a diagram of an embodiment of an automatic vehicle height-adjusting system according to this invention.

Referring to FIG. 1, a pair of combination shock absorber and air spring units 10 and 11 are of the type suitable for use with a motor vehicle leveling system or vehicle height-adjusting system. Each of these combination shock absorber and air spring units 10 and 11 includes a top end mount and closure assembly 12 and a bottom end mount assembly 13. The top end assembly 12 is adapted to be connected to the frame or body of a motor vehicle which represents the motor vehicle sprung mass. The bottom end mount assembly 13 is adapted to be connected to a suitable portion of the rear suspension assembly or the rear axle assembly which represents the motor vehicle unsprung mass having an essentially fixed height with respect to the road surface along which the motor vehicle moves. The units 10 and 11 represent auxiliary load supporting devices which, in association with a pair of primary load supporting springs 14 and 15, adjustably maintain a vertical spacing or curb height between the vehicle body and the axle housing.

To adjust the vertical spacing or curb height between the vehicle body and the axle housing, that is, the height of the vehicle body with respect to the road surface, the vehicle height-adjusting system adjusts the pressure in a compressible fluid or air chamber 16 of variable volume in each of the units 10 and 11. The air chamber 16 is essentially formed between the upper half of the shock absorber 17 and a cylindrical outer shell 18 coaxial with the shock absorber 17. The upper end of the outer shell 18 is secured to and sealed by the top end assembly 12. The lower end of the outer shell 18 is sealed by a rolling diaphragm 19 and the shock absorber 17. In this way, the air chamber 16 is defined by the top end assembly 12, the outer shell 18, the diaphragm 19, and the outer surfaces of the shock absorber 17. The shock absorber 17 includes a hydraulic cylinder or housing 20 and a piston rod 21 extending movably therefrom in a well-known manner. The piston rod 21 extends through the air chamber 16, and the top end of the piston rod 21 is secured to the top end assembly 12. The hydraulic cylinder 20 is secured to the bottom end mount assembly 13. One end of the diaphragm 19 is sealingly secured to the outer shell 18, and the other end of the diaphragm 19 is sealingly secured to the hydraulic cylinder 20. The diaphragm 19 and the connection thereof to the outer shell 18 and the hydraulic 20 are designed so that the hydraulic cylinder 20 and the bottom end mount assembly 13 will move downward and upward relative to the outer shell 18 and the top end assembly 12 as the pressure in the air chamber 16 increases and decreases, respectively. In this way, the vertical spacing or curb height between the vehicle body and the axle housing, that is, the height of the vehicle body with respect to the road surface, increases and decreases as the pressure in each air chamber 16 increases and decreases, respectively. A communication passage 22 is formed in the piston rod 21 in such a manner that one end of the passage 22 opens into the air chamber 16 and the other end of the passage 22 opens at the top surface of the piston rod 21.

An upper spring seat 23 is formed on the top end assembly 12. A lower spring seat 24 is secured to the hydraulic cylinder 20. Each of the primary load supporting springs 14 and 15 of the helical or coil type seats between the upper and lower seats 23 and 24.

A pressurized air or pressure generating device 30 includes an air compressor or pump 31, an electric motor 32 mechanically connected to the compressor 31 to drive the latter, and an electric power supply 32A electrically connected to the electric motor 32 to energize the latter. When the electric motor 32 is energized by the electric power supply 32A, the compressor 31 comes into effect to generate compressed air. The outlet of the compressor 31 communicates with a fluid accumulator or air tank 33 via a fluid or air line 34, so that the compressed air is conducted from the compressor 31 to the air tank 33 via the air line 34. An air drier 35 is provided along the air line 34 to remove moisture from the compressed air supplied to the air tank 33. A one-way or check valve 36 is disposed along the air line 34 downstream of the air drier 35 in such a manner as to permit air flow only in the direction from the compressor 31 to the air tank 33. The check valve 36 permits the compressed air to travel from the compressor 31 to the air tank 33 when the pressure at the outlet of the compressor 31 exceeds the pressure in the air tank 33, and prohibits the compressed air from escaping to the air line 34 upstream of the check valve 36 from the air tank 33, for example, when the pressure at the outlet of the compressor 31 is lower than the pressure in the air tank 33. In this way, the pressure in the air tank 33 is maintained at approximately a predetermined level defined by the compression characteristics of the compressor 31.

A pressure-responsive switch may be provided in such a manner as to respond or sense the pressure in the air tank 33 or that in the air line 34 downstream of the check valve 36. In this case, the pressure-responsive switch is electrically disposed in the connection between the electric motor 32 and the electric power source 32A to selectively energize and de-energize the motor 32 in response to the sensed pressure. Generally, the pressure-responsive switch is designed so that the motor 32 will be energized when the sensed pressure drops to below a predetermined level and will be de-energized when the sensed pressure rises to above the predetermined level. In this way, the pressure in the air tank 33 can be regulated more precisely.

One end of a fluid or air line 37 is connected to the air tank 33. The other end of the air line 37 forks into two branches leading to the free ends of the two communication passages 22. Thus, the air tank 33 can communicate with the air chambers 16 via the air line 37 and the communication passages 22. An electrically-driven or solenoid ON-OFF valve 38 is provided along the air line 37 to selectively block and open the air line 37. When the solenoid valve 38 opens the air line 37, the compressed air is transmitted to the air chambers 16 from the air tank 33 so that the pressure in the air chambers 16 rises. When the solenoid valve 38 blocks the air line 37, this compressed air transmission to the air chambers 16 from the air tank 33 is interrupted so that any further increase in the pressure in the air chambers 16 is prevented. The solenoid valve 38 is of the normally closed type, so that the solenoid valve 38 blocks the air line 37 when de-energized and opens the air line 37 when energized.

One end of a fluid or air line 39 is connected to the air line 37 downstream of the solenoid valve 38. The other end of the air line 39 is connected to the air line 34 downstream of the air drier 35 but upstream of the check valve 36. A one-way or check valve 40 is disposed along the air line 39 in such a manner as to permit air flow only in the direction from the air line 37 toward the air line 34. The check valve 40 permits the air to flow out of the air chambers 16 toward the air line 34 when the pressure in the air chambers 16 exceeds the pressure in the air line 34 upstream of the other check valve 36, and prohibits the compressed air from entering the air chambers 16 from the compressor 31 via the air lines 34 and 39 when the pressure in the air chambers 16 is lower than the pressure in the air line 34 upstream of the other check valve 36. One end of a fluid or air relief line 41 is connected to the air line 34 upstream of the air drier 35. The other end of the relief line 41 opens to atmosphere. An electrically-driven or solenoid ON-OFF valve 42 is provided along the relief line 41 to selectively block and open the relief line 41. When the solenoid valve 42 opens the relief line 41, the air escapes from the air chambers 16 to atmosphere via the communication passages 22, the air lines 37 and 39, the check valve 40, the air line 34, the air drier 35, the relief line 41, and the solenoid valve 42 so that the pressure in the air chambers 16 drops. When the solenoid valve 42 blocks the relief line 41, this air escape is generally interrupted so that any further decrease in the pressure in the air chambers 16 is prevented. The solenoid valve 42 is of the normally closed type, so that the solenoid valve 42 blocks the relief line 41 when de-energized and opens the relief line 41 when energized.

First and second distance sensors 43 and 44 are provided to detect distances between the vehicle body and road surfaces on which the motor vehicle is moving, that is, the height of the vehicle body with respect to the road surface. As shown in FIGS. 2A, 2B, 3A, 3B, and 4, these distance sensors 43 and 44 are attached to the bottom surface of the vehicle body at such positions as to be aligned with one another transversely with respect to the vehicle body and be slightly forward of the rear wheels of the vehicle. The first distance sensor 43 is essentially centered in the transverse direction with respect to the vehicle body. In other words, the first distance sensor 43 is essentially in the vertically-extending longitudinal center or half plane of the vehicle body. The second distance sensor 44 is located directly in front of one of the vehicle rear wheels, that is, on one side of the vehicle body. The second distance sensor 44 may be at any other position as long as it is displaced or distant from the above center plane of the vehicle body in the transverse direction with respect to the vehicle body. These distance sensors 43 and 44 are mounted at the same level with respect to the vehicle body, and may also be at different levels. The first and second distance sensors 43 and 44 are arranged so as to respectively sense the vertical distances a and b therefrom to the road surface in the case where the motor vehicle is on a horizontal road. These sensors 43 and 44 output signals A and B whose voltages vary linearly with the distances a and b, respectively. Since these sensors 43 and 44 are stationary with respect to the vehicle body, the distance signals A and B represent distances between the vehicle body and the road surface, that is, heights of the vehicle body with respect to the road surface. Specifically, the signal A from the distance sensor 43 represents the distance between the road surface and the center of the vehicle body in the transverse direction, while the signal B from the other sensor 44 represents the distance between the road surface and the vehicle body directly in front of and near the vehicle rear wheel.

A control unit 45 is provided to control the solenoid valves 38 and 42 in response to the distance signals A and B to automatically adjust the vehicle height. The control unit 45 is connected by means of electrical leads 43A and 44A to the output terminals of the distance sensors 43 and 44, respectively, to receive the distance signals A and B. The control unit 45 is connected by means of electrical leads 38A and 42A to the solenoid valves 38 and 42 to supply binary control signals $S_1$ and $S_2$ thereto, respectively. High-level control signals $S_1$ and $S_2$ energize the solenoid valves 38 and 42, respectively. Low-level control signals $S_1$ and $S_2$ de-energize the solenoid valves 38 and 42, respectively. Thus, when the control signals $S_1$ and $S_2$ go high, the solenoid valves 38 and 42 are opened, respectively. When the control signals $S_1$ and $S_2$ go low, the solenoid valves 38 and 42 are closed, respectively.

Figure 5:
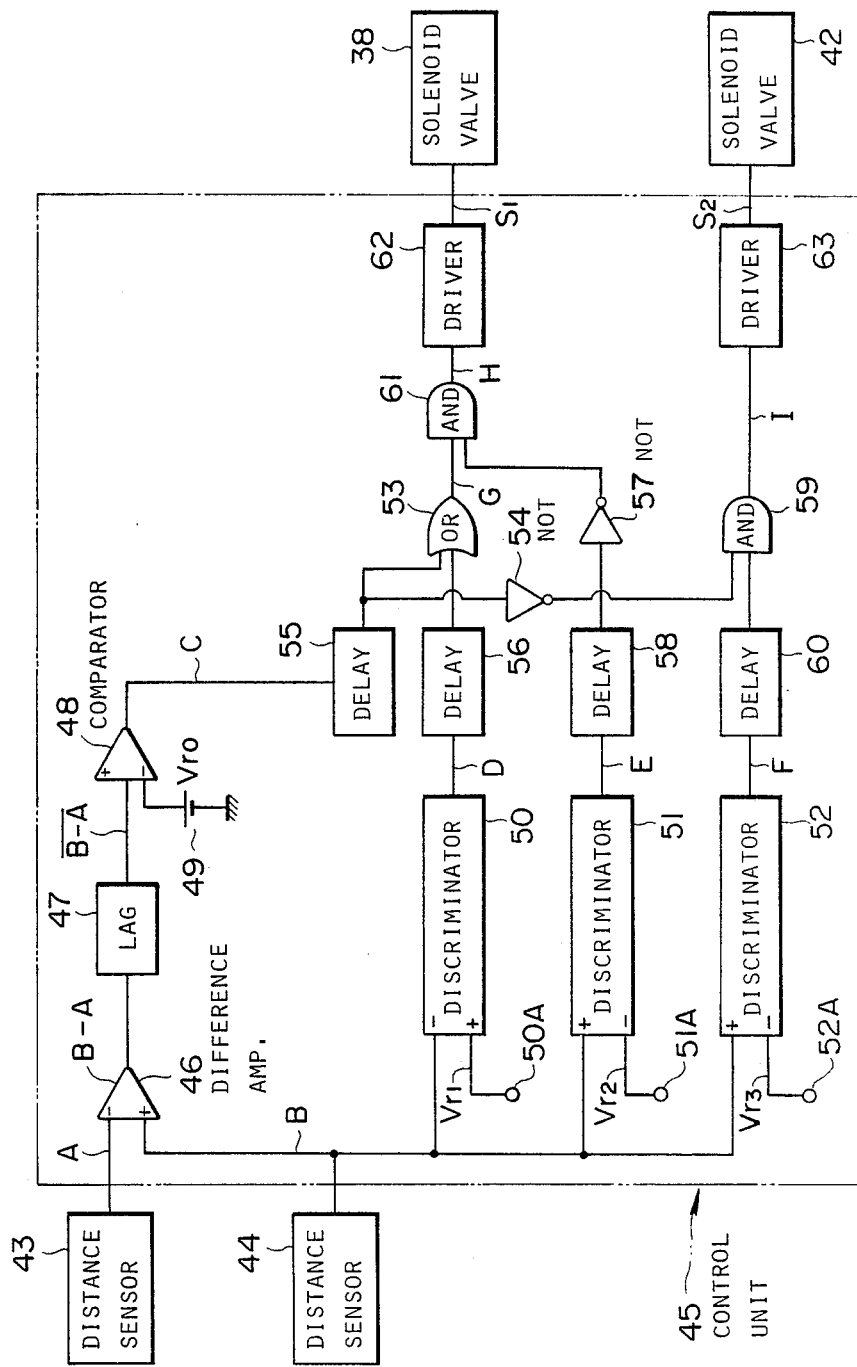
FIG. 5 is a diagram of details of the control unit of FIG. 1.

As shown in FIG. 5, the control unit 45 includes a difference amplifier 46. The inverting input terminal of the difference amplifier 46 is connected to the output terminal of the first distance sensor 43 to receive the first distance signal A therefrom. The non-inverting input terminal of the difference amplifier 46 is connected to the output terminal of the second distance sensor 44 to receive the second distance signal B therefrom. The difference amplifier 46 outputs a voltage signal B-A, the level of which varies linearly with the difference b-a between the distances a and b, that is, the value of which represents the distance b minus the distance a. The input terminal of a first order lag circuit 47 is connected to the output terminal of the difference amplifier 46 to receive the difference signal B-A. The lag circuit 47 consists of an integrating circuit composed of a well-known combination of a capacitor and a resistor or resistors. The lag circuit 47 outputs a lag signal B-A in response to the difference signal B-A. The non-inverting input terminal of a comparator 48 is connected to the output terminal of the lag circuit 47 to receive the lag signal B-A. The inverting input terminal of the comparator 48 is connected to a constant voltage source 49 in such a manner as to receive a reference voltage $V_{ro}$ therefrom. The comparator 48 outputs a binary signal C, which is high when the voltage of the lag signal B-A is greater than the reference voltage $V_{ro}$ and which is low otherwise.

Figure 6:
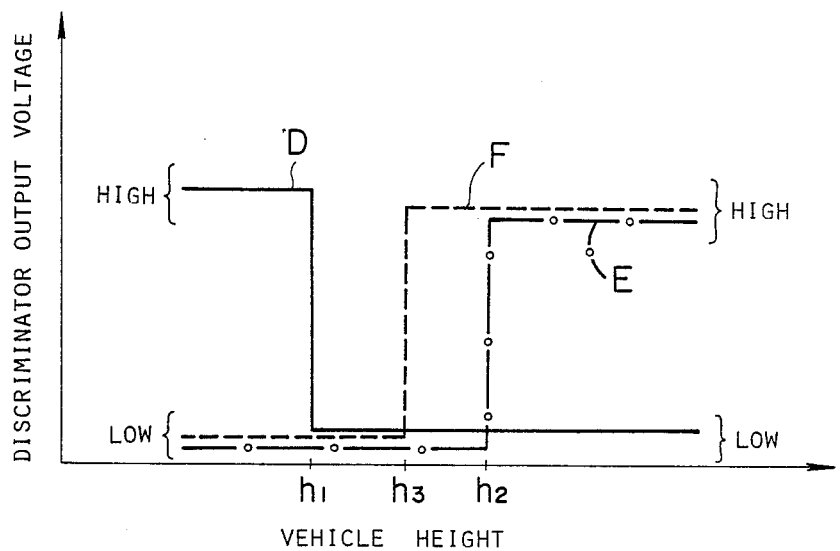
FIG. 6 is a diagram of the relationships between vehicle height and the outputs of the discriminators of FIG. 5.

The control unit 45 includes first, second, and third vehicle height detectors or discriminators 50, 51, and 52 consisting of comparators, respectively. The inverting input terminal of the first discriminator 50 is connected to the output terminal of the second distance sensor 44 to receive the second distance signal B. The non-inverting input terminal of the first discriminator 50 is supplied with a first reference voltage $V_{r1}$ produced by a first constant voltage source 50A. The first discriminator 50 outputs a binary signal D, which is low when the voltage of the second distance signal B is greater than the first reference voltage $V_{r1}$ and which is high otherwise. In other words, the signal D is low when the second distance b is greater than a first reference level $h_1$ defined by the first reference voltage $V_{r1}$ and is high otherwise, as shown by the solid line in FIG. 6. The non-inverting input terminal of the second discriminator 51 is connected to the output terminal of the second distance sensor 44 to receive the second distance signal B. The inverting input terminal of the second discriminator 51 is supplied with a second reference voltage $V_{r2}$ produced by a second constant voltage source 51A. The second discriminator 51 outputs a binary signal E, which is high when the voltage of the second distance signal B is greater than the second reference voltage $V_{r2}$ and which is low otherwise. In other words, the signal E is high when the second distance b is greater than a second reference level $h_2$ defined by the second reference voltage $V_{r2}$ and is low otherwise, as shown by the dot-dash line in FIG. 6. The non-inverting input terminal of the third discriminator 52 is connected to the output terminal of the second distance sensor 44 to receive the second distance signal B. The inverting input terminal of the third discriminator 52 is supplied with a third reference voltage $V_{r3}$ produced by a third constant voltage source 52A. The third discriminator 52 outputs a binary signal F, which is high when the voltage of the second distance signal B is greater than the third reference voltage $V_{r3}$ and which is low otherwise. In other words, the signal F is high when the second distance b is greater than a third reference level $h_3$ defined by the third reference voltage $V_{r3}$ and is low otherwise, as shown by the dashed line in FIG. 6. Specifically, the reference voltages $V_{r1}$, $V_{r2}$, and $V_{r3}$ are chosen so that the third reference level $h_3$ is greater than the first reference level $h_1$ and that the second reference level $h_2$ is greater than the third reference level $h_3$, i.e., $h_1 < h_3 < h_2$.

The output terminal of the comparator 48 is connected to the first input terminal of an OR gate 53 and the input terminal of a NOT gate 54 via a first delay circuit 55. The output terminal of the first discriminator 50 is connected to the second input terminal of the OR gate 53 via a second delay circuit 56. The output terminal of the second discriminator 51 is connected to the input terminal of another NOT gate 57 via a third delay circuit 58. The output terminal of the third discriminator 52 is connected to the first input terminal of an AND gate 59 via a fourth delay circuit 60. Specifically, the first delay circuit 55 retards changes in the level of the signal C by a predetermined length of time, provided that the level of the signal C remains for more than the predetermined length of time after having changed. The first delay circuit 55 will not transmit changes in the level of the signal C which are followed by other changes therein which occur within the predetermined length of time starting from the time of the occurrence of the former change. In this case, the first delay circuit 55 maintains a constant output level independent of temporary changes in the level of the signal C. The first delay circuit 55 will transmit changes in the level of the signal C even though followed by other changes therein when the subsequent changes occur after the predetermined length of time starting from the time of the occurrence of the former change. The second, third, and fourth delay circuits 56, 58, and 60 operate respectively on the signals D, E, and F in a way similar to the way in which the first delay circuit 55 operates on the signal C.

The OR gate 53 outputs a binary signal G, which is high when at least one of the outputs of the first and second delay circuits 55 and 56 is high and which is low otherwise. The output terminal of the OR gate 53 is connected to the first input terminal of another AND gate 61 to supply the signal G thereto. The NOT gate 57 inverts the output of the third delay circuit 58. The output terminal of the NOT gate 57 is connected to the second input terminal of the AND gate 61. The AND gate 61 outputs a binary signal H, which is high when both the signal G and the output of the NOT gate 57 are high and which is low otherwise. The output terminal of the AND gate 61 is connected to the input terminal of a first driving circuit or driver 62 to supply the signal H thereto. The driver 62 consisting of an amplifier magnifies the signal H and outputs the binary control signal $S_1$, which is high when the signal H is high and which is low otherwise. The output terminal of the driver 62 is electrically connected to the solenoid valve 38 to supply the control signal $S_1$ thereto.

The NOT gate 54 inverts the output of the first delay circuit 55. The output terminal of the NOT gate 54 is connected to the second input terminal of the AND gate 59. The AND gate 59 outputs a binary signal I, which is high when both the output signals of the NOT gate 54 and fourth delay circuit 60 are high and which is low otherwise. The output terminal of the AND gate 59 is connected to the input terminal of another driving circuit or driver 63 to supply the signal I thereto. The driver 63 consisting of an amplifier magnifies the signal I and outputs the binary control signal $S_2$, which is high when the signal I is high and which is low otherwise. The output terminal of the driver 63 is electrically connected to the solenoid valve 42 to supply the control signal $S_2$ thereto.

While the motor vehicle is moving along a level road as shown in FIGS. 2A and 2B, the voltage of the signal B-A indicating the difference b-a between the distances a and b is relatively small or is zero. The voltage of the signal B-A will be equal to that of the signal B-A, provided that the motor vehicle moves along the level road for more than the predetermined time defined by the time constant of the lag circuit 47. The reference voltage $V_{ro}$ is chosen so that the signal C from the comparator 48 will be low when the motor vehicle has been on a generally level road for more than the predetermined time defined by the lag circuit 47. The low-level signal C is thus transmitted to the OR gate 53 and the NOT gate 54 via the first delay circuit 55, provided that the signal C has remained low for more than the predetermined length of time defined by the delay circuit 55.

Under the conditions in which the motor vehicle travels continuously on the level road, when the distance b drops to below the first reference level $h_1$ due to an increase in the number of vehicle passengers or any increase in the vehicle load cuasing downward displacement of the vehicle body, the signal D from the first discriminator 50 goes high. The high-level signal D is transmitted to the OR gate 53 via the second delay circuit 56, provided that the signal D has remained high for more than the predetermined length of time defined by the delay circuit 56. The high-level signal D applied to the OR gate 53 causes the output G thereof to also go high. In this case, the signal E from the second discriminator 51 is low, since the distance b is clearly less than the second reference level $h_2$. The low-level signal E is transmitted to the NOT gate 57 via the third delay circuit 58, provided that the signal E has remained low for more than the predetermined length of time defined by the delay circuit 58. The low-level signal E applied to the NOT gate 57 causes the output thereof to be high. In this way, the outputs of both the NOT gate 57 and the OR gate 53 applied to respective input terminals of the AND gate 61 are high, so that the output H of the AND gate 61, i.e., the signal H therefrom is also high. As soon as the output of the second delay circuit 56 goes high, the signal H also changes to high level. The change of the signal H to high level causes the control signal $S_1$ from the driver 62 to go high, energizing the solenoid valve 38 and thereby opening the air line 37. Opening the air line 37 boosts the pressure in the air chambers 16, so that the vehicle body moves upward relative to the axle housing and thus the road surface. Note that the axle housing is generally stationary with respect to the road surface. This upward movement of the vehicle body will offset the original reduction of the distance b. In this case, the distance b is also less than the third reference level $h_3$ so that the signal F from the third discriminator 52 is low. The low-level signal F is transmitted to the AND gate 59 via the fourth delay circuit 60, provided that the signal F has remained low for more than the predetermined length of time defined by the fourth delay circuit 60. The low-level signal F applied to the AND gate 59 causes the output I thereof to be low, so that the control signal $S_2$ from the driver 63 is also low, de-energizing the solenoid valve 42 and thereby blocking the relief line 41.

When the distance b increases and returns to above the first reference level $h_1$ as a result of the above upward movement of the vehicle body, the signal D from the first discriminator 50 goes low. The low-level signal D is transmitted to the OR gate 53, provided that the signal D has remained low for more than the predetermined length of time defined by the second delay circuit 56. Since the output of the first delay circuit 55 applied to the OR gate 53 is low, the signal G from the OR gate 53 goes low as soon as the output of the second delay circuit 56 goes low. The change of the signal G to low level causes the signal H from the AND gate 61 to go low. As a result of the change of the signal H to low level, the control signal $S_1$ from the driver 62 goes low, de-energizing the solenoid valve 38 and thus blocking the air line 37. When the air line 37 is blocked, the increase of the pressure in the air chambers 16 is suspended and therefore the upward displacement of the vehicle body is also suspended.

Under the conditions in which the motor vehicle travels continuously along the level road, when the distance b rises to above the third reference level $h_3$ due to a descrease in the number of vehicle passengers or any decrease in the vehicle load causing upward displacement of the vehicle body, the signal F from the third discriminator 52 goes high. The high-level signal F is transmitted to the AND gate 59 via the fourth delay circuit 60, provided that the signal F has remained high for more than the predetermined length of time defined by the delay circuit 60. Since the low-level signal C will still be transmitted to the NOT gate 54 via the first delay circuit 55, the output of the NOT gate stays high. Therefore, the signal I from the AND gate 59 goes high as soon as the high-level signal F is transmitted thereto. The change of the signal I to high level causes the control signal $S_2$ from the driver 63 to go high, so that the solenoid valve 42 starts to be energized. Energizing the solenoid valve 42 causes the relief line 41 to be opened. As the relief line 41 is opened, the pressure in the air chambers 16 drops and consequently the vehicle body moves downward relative to the axle housing and thus the road surface. In this case, the distance b remains greater than the first reference level $h_1$ so that the signal D from the first discriminator 50 stays low. The low-level signal D is transmitted to the AND gate 61 via the second delay circuit 56 and the OR gate 53, and thus closes the AND gate 61. Therefore, the signal H from the AND gate 61 remains low. The low-level signal H causes the control signal $S_1$ from the driver 62 to be also low, de-energizing the solenoid valve 38 and blocking the air line 37.

When the distance b drops to below the third reference level $h_3$ as a result of the above downward movement of the vehicle body, the signal F from the third discriminator 52 goes low. The low-level signal F is transmitted to the AND gate 59 via the fourth delay circuit 60, provided that the signal F has remained low for more than the predetermined length of time defined by the fourth delay circuit 60. The transmission of the low-level signal F to the AND gate 59 closes the AND gate 59 and thus causes the signal I therefrom to go low. When the signal I goes low, the control signal $S_2$ from the driver 63 also goes low, de-energizing the solenoid valve 42 and blocking the relief line 41. Blocking the relief line 41 suspends the drop in the pressure of the air chambers 16 and thus the downward movement of the vehicle body.

In this way, as the motor vehicle moves along a level road, the distance b will be automatically returned to within a range between the first reference level $h_1$ and the second reference level $h_3$ even when the distance b increases or decreases out of the range. This range of between the levels $h_1$ and $h_3$ is designed, by choosing the reference voltage $V_{r1}$ and $V_{r3}$ applied to the first and third discriminators 50 and 52, so as to coincide with or be within a desired trim band.

Figure 3A:
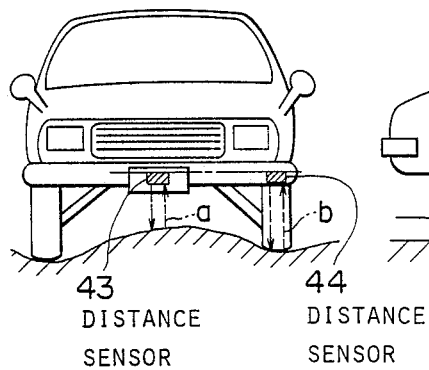
FIG. 3A is a front view of the motor vehicle similar to that of FIGS. 2A and 2B but standing on a road with wheel ruts.
Figure 3B:
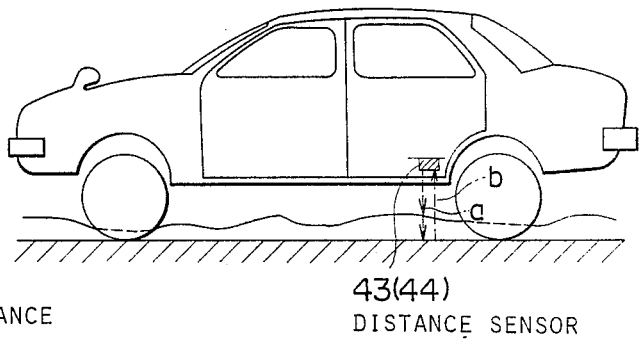
FIG. 3B is a side view of the motor vehicle of FIG. 3A.

When the motor vehicle enters a wheel-rutted road from the level road as shown in FIGS. 3A and 3B, the distance a becomes shorter than the distance b so that the voltage of the signal A becomes lower than the voltage of the signal B, thereby raising the voltage of the signal B-A from the difference amplifier 46. The voltage of the signal B-A from the lag circuit 47 rises after the predetermined length of time, defined by the lag circuit 47, starting from after the rise of the voltage of the signal B-A, provided that the signal B-A has remained at the increased level for more than the predetermined length of time defined by the lag circuit 47. The reference voltage $V_{ro}$ is chosen so that the signal C from the comparator 48 will be high when the motor vehicle has been on a wheel-rutted road for more than the predetermined length of time defined by the lag circuit 47. The high-level signal C is thus transmitted to the OR gate 53 and the NOT gate 54 via the first delay circuit 55, provided that the signal C has remained high for more than the predetermined length of time defined by the delay circuit 55. As soon as the high-level signal C is applied to the OR gate 53 and the NOT gate 54, the signal G fed from the OR gate 53 to the AND gate 61 goes high while the output from the NOT gate 54 to the AND gate 59 goes low.

Given that the distance b has continuously been between the reference levels $h_1$ and $h_3$ and thus has been smaller than the reference level $h_2$, the signal E from the second discriminator 51 is initially low. The low-level signal E is transmitted to the NOT gate 57 via the third delay circuit 58, so that the output from the NOT gate 57 to the AND gate 61 is initially high. Therefore, the signal H from the AND gate 61 goes high as soon as the signal G from the OR gate 53 goes high. The change of the signal H to high level causes the control signal $S_1$ from the driver 62 to also go high. Upon the change of the control signal $S_1$ to high level, the solenoid valve 38 is energized and the air line 37 is opened, thereby displacing the vehicle body upwards relative to the road surface. In this case, since the output from the NOT gate 54 to the AND gate 59 remains low, the AND gate 59 remains closed so that both the signal I from the AND gate 59 and the control signal $S_2$ from the driver 63 remain low to keep the solenoid valve 42 de-energized and the relief line 41 blocked.

When the distance b increases to above the second reference level $h_2$ after having risen out of the range of the reference levels $h_1$ and $h_3$ as a result of the above upward movement of the vehicle body, the signal E from the second discriminator 51 goes high. The high-level signal E is transmitted to the NOT gate 57 via the third delay circuit 58, provided that the signal E has remained high for more than the predetermined length of time defined by the second delay circuit 58. As soon as the high-level signal E is transmitted to the NOT gate 57, the output from the NOT gate 57 to the AND gate 61 goes low, thereby closing the AND gate 61 and changing the signal H outputted by the AND gate 61 to the low level. The change of the signal H to low level causes the control signal $S_1$ from the driver 62 to go low, de-energizing the solenoid valve 38 and blocking the air line 37. As a result of blocking the air line 37, the upward movement of the vehicle body is suspended. In this way, the distance b is normally maintained at above the second reference level $h_2$ while the motor vehicle is on the wheel-rutted road. The second reference level $h_2$ is designed, by choosing the second reference voltage $V_{r2}$ applied to the second discriminator 51, so as to adequately prevent the bottom surface of the vehicle body from striking the highest portion of the road surface when the vehicle bounces.

When the motor vehicle exits the wheel-rutted road and enters a level road, the distance a increases to near the distance b so that the voltage of the signal B-A from the difference amplifier 46 becomes relatively small or zero. The voltage of the signal B-A from the lag circuit 47 also comes relatively small or zero after the predetermined length of time starting from the reduction of the voltage of the signal B-A. As soon as the voltage of the signal B-A comes relatively small or zero, the signal C from the comparator 48 goes low. The output of the first delay circuit 55 also goes low, provided that the signal C has remained low for more than the predetermined length of time defined by the delay circuit 55. After the output of the first delay circuit 55 goes low, the level of the vehicle body is adjusted in the same way as described hereinbefore with respect to the case where the vehicle is continuously on the level road. As a result, the distance b is reduced to within the range of between the reference levels $h_1$ and $h_3$.

Figure 4:
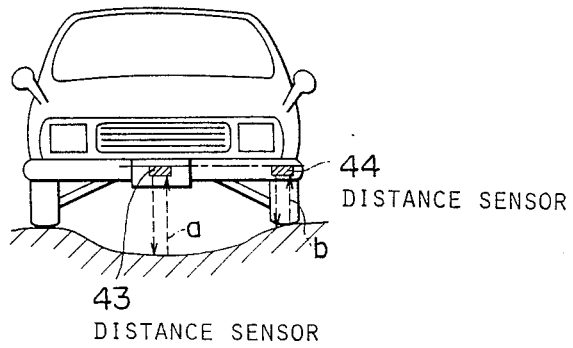
FIG. 4 is a front view of the motor vehicle similar to those of FIGS. 2A, 2B, 3A, and 3B but standing on a road with a central rut.

While the motor vehicle is on a centrally-rutted road as shown in FIG. 4, the distance a is greater than the distance b so that the voltage of the signal A is greater than that of the signal B. Thus, the voltage of the signal B-A from the difference amplifier 46 and thus that of the signal B-A from the lag circuit 47 remain negative, and consequently the signal C from the comparator 48 remains low. As a result, the level of the vehicle body is adjusted in a way similar to that described hereinbefore with respect to the case where the motor vehicle is continuously on the level road, so that the distance b is normally maintained within the range of between the reference levels $h_1$ and $h_3$.

Figure 7:
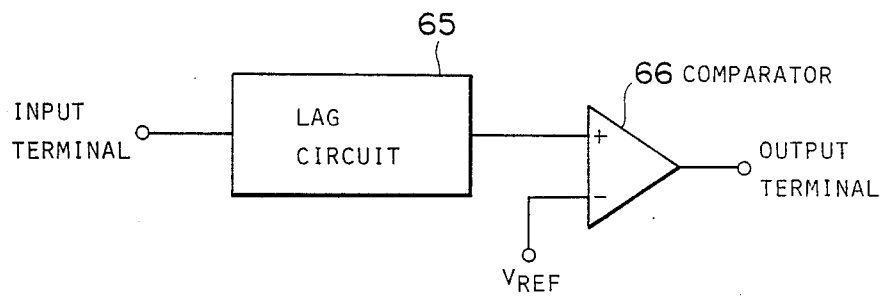
FIG. 7 is a diagram of details of each of the delay circuits of FIG. 5.

FIG. 7 shows an example of the detailed circuitry of the delay circuits 55, 56, 58, and 60, which includes a first-order lag circuit 65 and a comparator 66. The lag circuit 65 is composed of an integrating circuit consisting of a well-known combination of a capacitor and a resistor or resistors. The input terminal of the lag circuit 65 constitutes the input terminal of the delay circuit. The output terminal of the lag circuit 65 is connected to the non-inverting input terminal of the comparator 66 to apply the output from the lag circuit 65 thereto. The inverting input terminal of the comparator 66 is supplied with a reference voltage $V_{REF}$. The output terminal of the comparator 66 constitutes the output terminal of the delay circuit. The comparator 66 outputs a binary signal which is high when the output of the lag circuit 65 is greater than the reference voltage $V_{REF}$ and which is low otherwise. The reference voltage $V_{REF}$ is chosen to be between the maximal and minimal values of the voltage output of the lag circuit 65.

After a binary input signal to the lag circuit 65 goes high, the voltage of the output of the lag circuit 65 gradually rises to essentially the same level as the input signal, provided that the input signal remains high thereafter. In this case, the voltage of the output of the lag circuit 65 exceeds the reference voltage $V_{REF}$ after a first predetermined length of time starting from the time at which the input signal goes high. As soon as the voltage of the output of the lag circuit 65 exceeds the reference voltage $V_{REF}$, the output of the comparator 66 goes high. In this way, the voltage change of the input signal from the low to the high level is transmitted to the output terminal of the comparator 66 after the first predetermined length of time starting from the change.

After the input signal to the lag circuit 65 goes low, the voltage of the output of the lag circuit 65 gradually drops to essentially the same level as the input signal, provided that the input signal remains low thereafter. In this case, the voltage of the output of the lag circuit 65 drops below the reference voltage $V_{REF}$ after a second predetermined length of time starting from the time at which the input signal goes low. As soon as the voltage of the output of the lag circuit 65 drops below the reference voltage $V_{REF}$, the output of the comparator 66 goes low. In this way, the voltage change of the input signal from the high to the low level is transmitted to the output terminal of the comparator 66 after the second predetermined length of time starting from the change.

The first and second predetermined lengths of time depend on the reference voltage and the time constant of the lag circuit 65, and are chosen so as to be equal to each other. If the input signal changes back during the first or second predetermined length of time after the previous change of the input signal, no change will be transmitted to the output of the comparator 66 with respect to the previous change of the input signal, since the voltage of the output of the lag circuit 65 starts to reverse upon the second change of the input signal voltage. The first and second predetermined lengths of time are chosen so as to prevent unnecessary vehicle body adjusting operation as the vehicle body bounces and rebounces causing the distance b to temporarily vary out of and into the ranges defined by the reference levels $h_1$, $h_2$, and $h_3$. It should be noted that the delay circuits 55, 56, 58, and 60 may also be of other conventional types.

Returning to the first-order lag circuit 47, the time constant thereof is chosen so as to prevent unnecessary vehicle body adjusting operation when the vehicle body passes over a localized projection, such as a stone, on a road surface.

Figure 8:
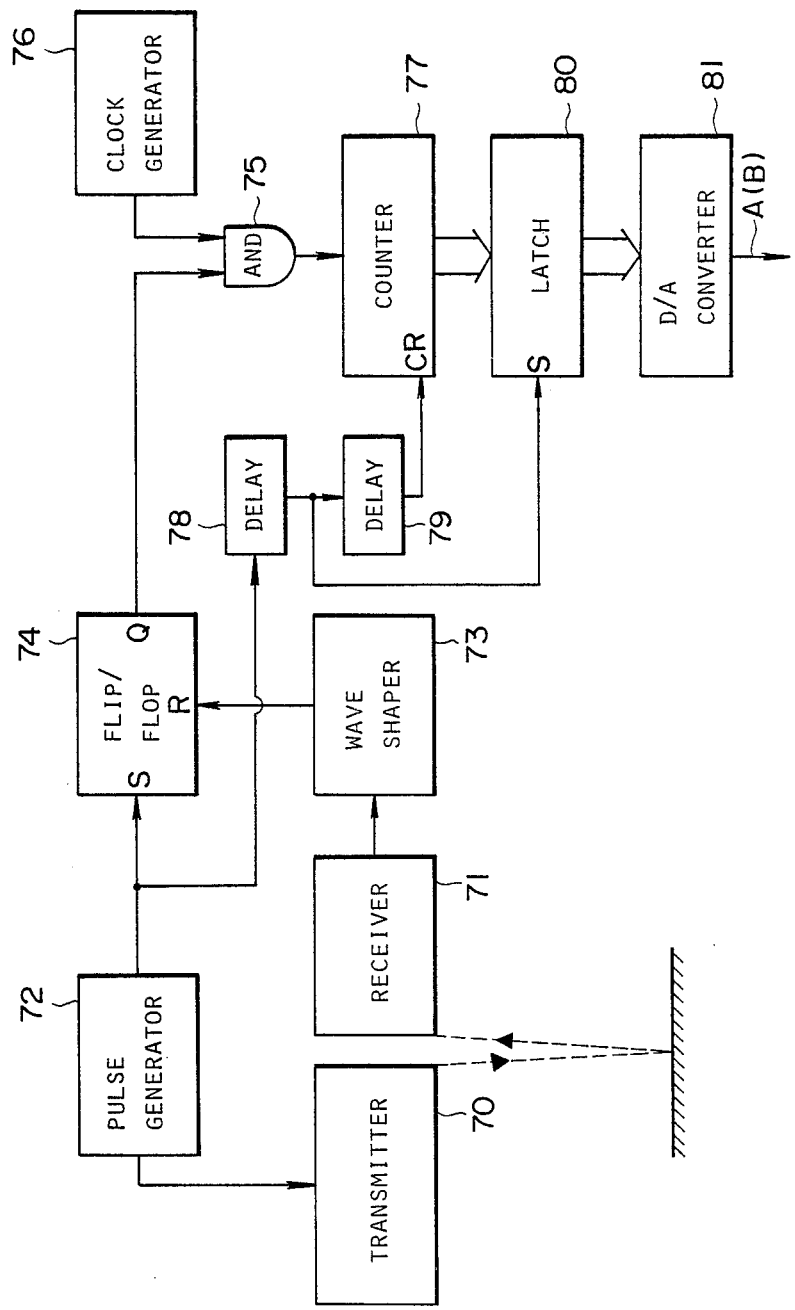
FIG. 8 is a diagram of details of each of the distance sensors of FIG. 1.

FIG. 8 shows an example of the detailed circuitry of the distance sensors 43 and 44, which includes an electrical-to-acoustical transducer or transmitter 70, and a acoustical-to-electrical transducer or receiver 71. The transmitter 70 converts electric power to ultrasonic waves. The receiver 71 converts ultrasonic waves to electric signals. The transmitter 70 and the receiver 71 are fixed to the vehicle body in such a manner that the ultrasonic waves outputted from the transmitter 70 travel vertically toward the road surface and are reflected by the road surface before traveling vertically back toward the receiver 71.

The output terminal of a pulse generator 72 is connected to the control terminal of the transmitter 70. The pulse generator 72 outputs pulses at a predetermined frequency. When a pulse is applied to the control terminal of the transmitter 70, the transmitter 70 generates a high-frequency acoustical wave. In this way, the transmitter 70 outputs the ultrasonic waves intermittently. When the ultrasonic waves are received by the receiver 71, the receiver 71 generates a corresponding alternating voltage whose frequency is equal to that of the ultrasonic wave. Since the ultrasonic waves are transmitted intermittently, the alternating voltage from the receiver 71 is also intermittent or in the form of a train of wave packets. The input terminal of a wave shaper 73 is connected to the output terminal of the receiver 71 to receive the intermittent alternating voltage therefrom. The wave shaper 73 converts each wave packet of the alternating voltage into a corresponding pulse whose duration or pulse width is equal to that of the wave packet of the alternating voltage. The wave shaper 73 can be an amplifier which is so designed so as to be saturated while it receives the alternating voltage. The length of time starting from the time of the leading edge of the pulse from the generator 72 and ending at the time of the leading edge of the corresponding pulse from the wave shaper 73 represents approximately the sum of the distances between the transmitter 70 and the road surface and between the road surface and the receiver 71, and thus represents approximately the height of the vehicle body with respect to the road surface.

The set terminal of a flip-flop circuit 74 is connected to the output terminal of the generator 72 to receive the pulses therefrom. The flip-flop circuit 74 is triggered by the leading edge of each pulse from the generator 72. The reset terminal of the flip-flop circuit 74 is connected to the output terminal of the wave shaper 73 to receive the pulses therefrom. The flip-flop circuit 74 is reset by the leading edge of each pulse from the wave shaper 73. In this way, the flip-flop circuit 74 outputs a pulse which starts from the time of the leading edge of the pulse from the generator 72 and which ends at the time of the leading edge of the pulse from the wave shaper 73. The output terminal of the flip-flop circuit 74 is connected to the first input terminal of an AND gate 75 to feed the pulse output thereto. The output terminal of a high-frequency clock pulse generator 76 is connected to the second input terminal of the AND gate 75 to feed the constant high-frequency pulses thereto. While each pulse from the flip-flop circuit 74 is applied to the AND gate 75, the AND gate 75 is open and transmits the pulses from the clock generator 76. In this way, the AND gate 75 outputs a train of packets of the pulses, the number of the pulses included in each of the packets being essentially proportional to or representing the duration of each of the pulses from the flip-flop circuit 74. Thus, this number of the pulses in each packet varies essentially linearly with the height of the vehicle body.

The input terminal of a counter 77 is connected to the output terminal of the AND gate 75 to receive the pulse packets therefrom. The counter 77 counts the pulses from the AND gate 75 and outputs a signal indicative of the number of the counted pulses. The clear or reset terminal of the counter 77 is connected to the output terminal of the generator 72 via a series combination of first and second delay circuits 78 and 79, so as to receive the pulses from the generator 72 with a predetermined time lag or delay defined by the delay circuits 78 and 79. When the pulses are applied to the clear or reset terminal of the counter 77, the counter 77 is cleared or reset. The predetermined time lag is chosen, by setting the time constants of the delay circuits 78 and 79, so that the counter 77 is cleared or reset between adjacent pulse packets from the AND gate 75, i.e., not during the pulse packets from the AND gate 75. The input terminal of a latch circuit 80 is connected to the output terminal of the counter 77 to receive the signal therefrom. The strobe or control terminal of the latch circuit 80 is connected to the junction between the delay circuits 78 and 79, so as to receive the pulses from the generator 72 with a predetermined time lag or delay defined by the time constant of the delay circuit 78. As each of the pulses is applied to the strobe or control terminal of the latch circuit 80, the latch circuit 80 samples the signal from the counter 77. The latch circuit 80 holds this sampled signal until the subsequent pulse is applied to the control terminal. The previously sampled signal is replaced by a new sampled signal in response to each pulse. In this case, the signal from the counter 77 is sampled prior to the clearing of the counter 77 by a predetermined length of time defined by the time constant of the delay circuit 79 connected between the latch circuit 80 and the counter 77. This predetermined length of time is chosen so that the sampling of the signal from the counter 77 occurs between adjacent pulse packets from the AND gate 75, i.e., not during pulse packets from the AND gate 75. In this way, the latch circuit 80 holds the signal from the counter 77 and outputs the sampled signal which indicates the number of the clock pulses during each pulse packet supplied to the counter 77 from the AND gate 75. The input terminal of a digital-to-analog (D/A) converter 81 is connected to the output terminal of the latch circuit 80 to receive the signal therefrom. In response to the signal from the latch circuit 80, the converter 81 outputs a voltage which is proportional to the number of the clock pulses in each pulse packet supplied to the counter 77 from the AND gate 75. Thus, the voltage of the converter 81 varies essentially linearly with the height of the vehicle body and constitutes the distance signal A or B outputted from the distance sensor 43 or 44. It should be noted that the distance sensors 43 and 44 may also be of other conventional types.

Figure 9:
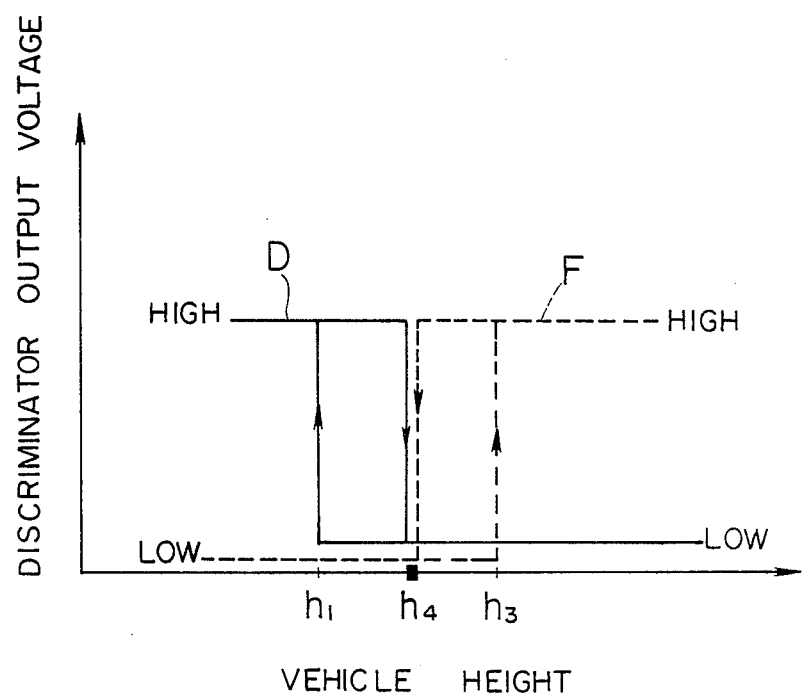
FIG. 9 is a diagram of the relationships between vehicle height and the outputs of the discriminators with hysteresis action of FIG. 5.

Returning to FIG. 5, the discriminators 50 and 52 may have hysteresis in changes in the outputs thereof. To this end, the discriminators 50 and 52 consist of Schmitt circuits. In this case, the discriminator 50 is designed so that the output signal D therefrom goes high when the second distance b or vehicle height drops below the first reference level $h_1$, and goes low when the second distance b or vehicle height exceeds a fourth reference level $h_4$ greater than the first level $h_1$, as shown in FIG. 9. The other discriminator 52 is designed so that the output signal F goes high when the second distance b or vehicle height exceeds the third reference level $h_3$, and goes low when the second distance b or vehicle height drops below the fourth reference level $h_4$ smaller than the third reference level $h_3$, as shown in FIG. 9. These hysteresis actions stabilize the control of the vehicle height. What is more, the accuracy of the vehicle height control is adequate, since increasing and reducing the vehicle height are interrupted in response to the fact that the vehicle height exceeds and drops below the common reference level $h_4$, respectively.

It should be understood that further modifications and variations may be made in this invention without departing from the spirit and scope of this invention as set forth in the appended claims.

What is claimed is:

1. An automatic vehicle height-adjusting system for a vehicle including a sprung mass and an unsprung mass in contact with a road surface, the sprung mass being supported on the unsprung mass via a spring or the like, the system comprising:
   (a) means for sensing a distance between the sprung mass and the road surface at a point spaced transversely from the path of a wheel on the vehicle and generating a distance signal indicative thereof;
   (b) means responsive to the distance signal for determining whether or not the distance is less than a first predetermined value and for generating a first comparison signal indicative thereof;
   (c) means responsive to the distance signal for determining whether or not the distance is greater than a second predetermined value and for generating a second comparison signal indicative thereof, the second predetermined value being greater than the first predetermined value;
   (d) means responsive to the first and second comparison signals for increasing the height of the sprung mass with respect to the unsprung mass when the distance is less than the first predetermined value and for decreasing the height of the sprung mass with respect to the unsprung mass when the distance is greater than the second predetermined value.

2. An automatic vehicle height-adjusting system as recited in claim 1, wherein the increasing/decreasing means suspends the height-increasing operation when the distance has returned to above the first predetermined value, and also suspends the height-decreasing operation when the distance has returned to below the second predetermined value.

3. An automatic vehicle height-adjusting system as recited in claim 1, further comprising means responsive to the distance signal for determining whether the distance is greater or less than a third predetermined value and for generating a third comparison signal indicative thereof, the third predetermined value being between the first and second predetermined values, the increasing/decreasing means being responsive to the third comparison signal for suspending the height-increasing operation when the distance has exceeded the third predetermined value and for suspending the height-decreasing operation when the distance has dropped below the third predetermined value.

4. An automatic vehicle height-adjusting system for a vehicle including a sprung mass and an unsprung mass in contact with a road surface, the sprung mass being supported on the unsprung mass via a spring or the like, the system comprising:
  (a) means for sensing a distance between the sprung mass and the road surface and generating a distance signal indicative thereof;
  (b) means responsive to the distance signal for determining whether or not the distance is less than a first predetermined value and for generating a first comparison signal indicative thereof;
  (c) means responsive to the distance signal for determining whether or not the distance is greater than a second predetermined value and for generating a second comparison signal indicative thereof, the second predetermined value being greater than the first predetermined value;
  (d) means responsive to the first and second comparison signals for increasing the height of the sprung mass with respect to the unsprung mass when the distance is less than the first predetermined value and for decreasing the height of the sprung mass with respect to the unsprung mass when the distance is greater than the second predetermined value;
  (e) means responsive to the distance signal for determining whether or not the distance is greater than a third predetermined value and for generating a third comparison signal indicative thereof;
  (f) the sensing means being operative to sense the distance between the road surface and a first point of the sprung mass;
  (g) means for sensing a second distance between the surface of the road and a second point of the sprung mass and generating a second distance signal indicative thereof, the second point being distant from the first point in the transverse direction with respect to the vehicle;
  (d) means responsive to the first and second distance signals for determining a difference which equals the first distance minus the second distance and for generating a different signal indicative thereof; and
  (i) means responsive to the difference signal for determining whether or not the difference is greater than a fourth predetermined value and for generating a fourth comparison signal indicative thereof;
  (j) The increasing/decreasing means being responsive to the third and fourth comparison signals for, in the case where the difference exceeds the fourth predetermined value, disabling the height-increasing/decreasing operation responsive to the first and second comparison signals and increasing the height of the sprung mass with respect to the unsprung mass until the distance exceeds the third predetermined value.

5. An automatic vehicle height-adjusting system as recited in claim 4, wherein the second point is in the vertically-extending longitudinal center plane of the vehicle.

* * * * *